No. 877,274. PATENTED JAN. 21, 1908.
H. E. WEBER.
ARM REST.
APPLICATION FILED DEC. 17, 1906.

Witnesses
Harry O. Rostetter.
Mary A. Cavanaugh.

Inventor
Henry E. Weber,
By Harry Frease.
Attorney

UNITED STATES PATENT OFFICE.

HENRY E. WEBER, OF CANTON, OHIO.

ARM-REST.

No. 877,274. Specification of Letters Patent. Patented Jan. 21, 1908.

Application filed December 17, 1906. Serial No. 348,149.

*To all whom it may concern:*

Be it known that I, HENRY E. WEBER, a citizen of the United States, residing at Canton, in the county of Stark and State of Ohio, have invented certain new and useful Improvements in Arm-Rests, of which the following is a specification.

The invention relates to an adjustable arm rest for use on dental, surgical and other like chairs; and the object of the improvement is to provide means for adjusting and locking the arm rest in various desired positions. This object is attained by the construction, mechanism, and arrangement illustrated in the accompanying drawing, in which—

Figure 1:
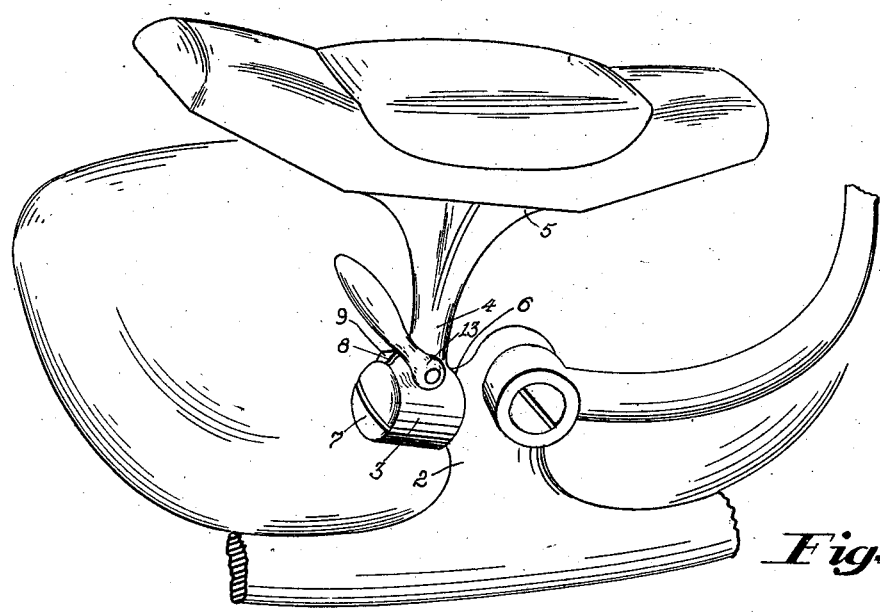
Figure 2:
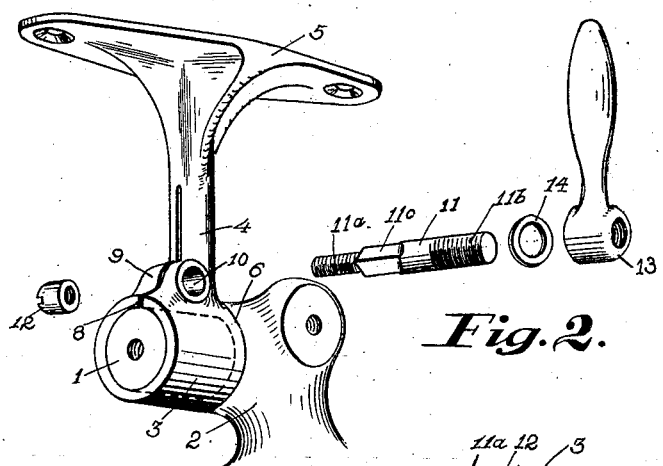
Figure 3:
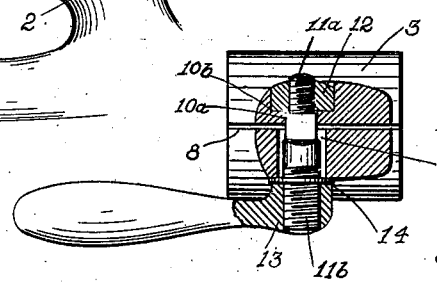

Figure 1 is a perspective view of a fragment of a chair-seat showing the arm rest applied thereto; Fig. 2, a perspective view of the arm-rest bracket on its supporting pivot, showing the locking parts separated and in line for assembling; and Fig. 3, a plan view showing the locking parts in section and in proper position.

Similar numerals refer to similar parts throughout the drawing.

The pivot post 1 is provided on the side of the seat- or chair- frame 2, which post may be longitudinally positioned as shown in the drawing. The tubular collar or sleeve 3 is formed on the lower end of the shank 4 of the arm-rest bracket 5 and this sleeve is adapted to fit and rotate on the pivot-post of the chair-frame, and to be held in proper endwise position thereon between the annular shoulder 6 and the cap screw 7 on the end thereof. The longitudinal kerf or slit 8 is cut or formed in the upper side of the sleeve and extends upward some distance in the shank of the arm-rest bracket, the closure of which slit permits the sleeve to be tightened and clamped around the pivot-post without materially weakening the sleeve. The boss 9 is formed on the upper side of the sleeve, preferably at the junction of the shank therewith, through which boss is provided the transverse aperture 10.

The locking bolt 11 is adapted to be entered in and through the transverse aperture, and the adjustable head or nut 12 and the handled hub 13 are adapted to be screwed on the respective inner and outer threaded ends $11^a$ and $11^b$ of the bolt, with the washer 14 preferably intervening between the hub and the end of the boss. The median portion $11^c$ of the bolt is preferably formed square or angular in cross section, and a corresponding part $10^a$ of the transverse aperture is likewise formed for the purpose of stopping the bolt from rotation; and the inner end of the transverse aperture is preferably countersunk, as at $10^b$, to receive the nut on the inner end of the bolt. It will be noted that by this construction and arrangement the bolt can always be adjusted to bring the outward end thereof entirely within the hub of the handle. When the parts of the locking bolt are in proper position, as shown on Fig. 3, the sleeve can be tightly and rigidly clamped on the pivoted post by merely rotating the handle of the hub in one direction, and the sleeve can likewise be loosened for an adjustment of the arm-rest by reversing this rotation. It will be noted that by this construction and arrangement there are no objectional parts protruding or projecting from the inner, under or outer side of the clamping sleeve, to catch the clothing or interfere with the freedom of movement of the patient or the operator.

What I claim as my invention, and desire to secure by Letters Patent, is—

A chair frame having a pivot thereon, an adjacent arm-rest having a shank with a sleeve thereon adapted to fit and to rotate on the pivot, a longitudinal slit in the adjoining parts of the shank and the sleeve, a transverse aperture at the junction of the shank and sleeve having an angular median portion, a bolt in the aperture having a corresponding angular part, and a head on one end and a hand-hub on the other end of the bolt, whereby the sleeve can be clamped around the pivot by a closure of the slit.

In testimony whereof, I have hereunto signed my name to this specification in the presence of two subscribing witnesses.

HENRY E. WEBER.

In presence of—
HARRY FREASE,
MARY A. CAVANAUGH.